(12) United States Patent
D'Urso

(10) Patent No.: US 8,631,467 B2
(45) Date of Patent: Jan. 14, 2014

(54) CONTEXTUAL VISUAL CHALLENGE IMAGE FOR USER VERIFICATION

(75) Inventor: Christopher Andrew D'Urso, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 1388 days.

(21) Appl. No.: 11/515,067

(22) Filed: Sep. 1, 2006

(65) Prior Publication Data

US 2008/0072293 A1     Mar. 20, 2008

(51) Int. Cl.
| | |
|---|---|
| G06F 15/16 | (2006.01) |
| H04L 29/06 | (2006.01) |
| G06F 17/30 | (2006.01) |
| G06F 12/16 | (2006.01) |
| G06Q 20/00 | (2012.01) |

(52) U.S. Cl.
USPC .................. 726/4; 726/23; 705/67; 709/229

(58) Field of Classification Search
USPC ............................ 726/4, 23; 705/67; 709/229
See application file for complete search history.

(56) References Cited

U.S. PATENT DOCUMENTS

| | | | |
|---|---|---|---|
| 4,695,966 | A | 9/1987 | Takakura |
| 4,949,391 | A | 8/1990 | Faulkerson |
| 5,539,868 | A | 7/1996 | Hosoya et al. |
| 6,037,984 | A | 3/2000 | Isnardi et al. |
| 6,195,698 | B1 | 2/2001 | Lillibridge et al. |
| 6,243,093 | B1 | 6/2001 | Czerwinski et al. |
| 6,266,158 | B1 | 7/2001 | Hata |
| 6,292,575 | B1 | 9/2001 | Bortolussi et al. |
| 6,397,355 | B1 | 5/2002 | Curtis et al. |
| 6,618,117 | B2 | 9/2003 | Silverbrook |
| 6,636,216 | B1 | 10/2003 | Silverbrook et al. |
| 6,721,423 | B1 | 4/2004 | Anderson et al. |
| 6,750,944 | B2 | 6/2004 | Silverbrook et al. |
| 6,763,515 | B1 | 7/2004 | Vazquez et al. |
| 6,829,748 | B1 | 12/2004 | Browne et al. |
| 6,868,539 | B1 | 3/2005 | Travison et al. |
| 6,895,507 | B1 | 5/2005 | Teppler |
| 6,915,409 | B1 | 7/2005 | Peterson |

(Continued)

FOREIGN PATENT DOCUMENTS

| | | |
|---|---|---|
| GB | 2429094 | 2/2007 |
| WO | WO-2005122453 A1 | 12/2005 |

(Continued)

OTHER PUBLICATIONS

"U.S. Appl. No. 10/186,637, Non-Final Office Action mailed Dec. 19, 2005", 9 pgs.

(Continued)

Primary Examiner — Michael Simitoski
(74) Attorney, Agent, or Firm — Schwegman Lundberg & woessner, P.A.

(57) ABSTRACT

A method and a system generate a contextual visual challenge image to be presented to a user thereby to verify that the user is human. For example, an image module generates a visual challenge to be presented to a user as part of a challenge-response to verify that the user is human. A contextual background module identifies a contextual background that is contextual to a specific environment and a combiner image module combines the visual challenge and the contextual background into an image which is to be presented to the user in the specific environment, the contextual background associating the visual challenge with the specific environment.

27 Claims, 13 Drawing Sheets

(56) References Cited

U.S. PATENT DOCUMENTS

| | | | |
|---|---|---|---|
| 6,947,557 | B1 | 9/2005 | Megiddo et al. |
| 7,149,899 | B2 | 12/2006 | Pinkas et al. |
| 7,200,576 | B2 | 4/2007 | Steeves et al. |
| 7,300,058 | B2 | 11/2007 | Ogilvie et al. |
| 7,383,570 | B2 | 6/2008 | Pinkas et al. |
| 7,454,794 | B1 | 11/2008 | Hibberd |
| 7,770,209 | B2 | 8/2010 | Billingsley et al. |
| 7,891,005 | B1 | 2/2011 | Baluja et al. |
| 8,473,336 | B1* | 6/2013 | Simmons ............ 705/14.1 |
| 2001/0037468 | A1 | 11/2001 | Gaddis |
| 2003/0014412 | A1 | 1/2003 | Collart |
| 2003/0204569 | A1 | 10/2003 | Andrews et al. |
| 2004/0003258 | A1 | 1/2004 | Billingsley et al. |
| 2004/0199597 | A1 | 10/2004 | Libbey et al. |
| 2005/0052705 | A1* | 3/2005 | Hersch et al. ............ 358/3.28 |
| 2005/0065802 | A1* | 3/2005 | Rui et al. ............ 705/1 |
| 2005/0066201 | A1 | 3/2005 | Goodman et al. |
| 2005/0138376 | A1 | 6/2005 | Fritz et al. |
| 2005/0140675 | A1 | 6/2005 | Billingsley et al. |
| 2005/0198580 | A1 | 9/2005 | Hua et al. |
| 2005/0229251 | A1 | 10/2005 | Chellapilla et al. |
| 2006/0095578 | A1 | 5/2006 | Paya et al. |
| 2006/0136219 | A1 | 6/2006 | Wang |
| 2006/0287963 | A1 | 12/2006 | Steeves et al. |
| 2007/0005500 | A1 | 1/2007 | Steeves et al. |
| 2007/0026372 | A1 | 2/2007 | Huelsbergen |
| 2007/0043681 | A1* | 2/2007 | Morgan et al. ............ 705/67 |
| 2007/0074154 | A1 | 3/2007 | Billingsley et al. |
| 2007/0223779 | A1* | 9/2007 | Curtis ............ 382/100 |
| 2007/0250920 | A1 | 10/2007 | Lindsay |
| 2008/0016551 | A1 | 1/2008 | Pinkas et al. |
| 2008/0050018 | A1 | 2/2008 | Koziol |
| 2008/0066014 | A1 | 3/2008 | Misra |
| 2008/0209223 | A1 | 8/2008 | Nandy et al. |
| 2009/0077628 | A1 | 3/2009 | Elson et al. |
| 2009/0094687 | A1 | 4/2009 | Jastrebski et al. |

FOREIGN PATENT DOCUMENTS

| | | |
|---|---|---|
| WO | WO-2008030363 A2 | 3/2008 |
| WO | WO-2008030363 A3 | 3/2008 |
| WO | WO-2008091675 A1 | 7/2008 |
| WO | WO-2008106032 A2 | 9/2008 |

OTHER PUBLICATIONS

"U.S. Appl. No. 10/186,637, Notice of Allowance mailed Jul. 21, 2006", 6 pgs.

"U.S. Appl. No. 10/186,637, Response filed Apr. 19, 2006 Non-Final Office Action mailed Dec. 19, 2005", 15 pgs.

"U.S. Appl. No. 10/863,609, Response filed Apr. 1, 2006 Non-Final Office Action mailed Nov. 1, 2005.pdf", 11 pgs.

"U.S. Appl. No. 10/863,609, Response filed Oct. 22, 2007 to Final Office Action mailed Aug. 20, 2007", 7 pgs.

"U.S. Appl. No. 10/863,609, Advisory Action mailed Nov. 16, 2007", 2 pgs.

"U.S. Appl. No. 10/863,609, Final Office Action mailed Aug. 20, 2007", 13 pgs.

"U.S. Appl. No. 10/863,609, Non-Final Office Action mailed Jan. 17, 2007", 15 pgs.

"U.S. Appl. No. 10/863,609, Non-Final Office Action mailed Nov. 1, 2005", 11 pgs.

"U.S. Appl. No. 10/863,609, Non-Final Office Action mailed Jun. 13, 2006", 9 pgs.

"U.S. Appl. No. 10/863,609, Preliminary Amendment mailed Aug. 4, 2005", 3 pgs.

"U.S. Appl. No. 10/863,609, Response filed Oct. 13, 2006 Non-Final Office Action mailed Jun. 13, 2006", 9 pgs.

"U.S. Appl. No. 10/863,609, Response filed May 17, 2007 Non-Final Office Action mailed Jan. 17, 2007", 12 pgs.

"U.S. Appl. No. 11/679,527, Non-Final Office Action mailed Mar. 25, 2008", 9 Pgs.

"CAPTCHA", http://en.wikipedia.org/wiki/CAPTCHA, From Wikipedia, the free encyclopedia, (Aug. 21, 2006).

"History—First Use—Alta-Vista", http://www2.parc.com/istl/projects/captcha/history.htm, Parc Captcha, (2003).

"International Application Serial No. PCT/US07/18907, International Search Report mailed Mar. 17, 2008", 4 pgs.

"International Application Serial No. PCT/US07/18907, Written Opinion mailed Mar. 17, 2008", 5 pgs.

Baird, H. S, et al., "Human Interactive Proofs and Document Image Analysis", *In Proceedings of the 5th International Workshop on Document Analysis Systems V*, vol. 2423,, (Aug. 19-21, 2002), 507-518 pgs.

Brelstaff, Gavin, et al., "Practical application of visual illusions: errare humanum est", *ACM International Conference Proceeding Series: vol. 95 Proceedings of the 2nd symposium on Applied perception in graphics and visualization.*,(2005), 161-161.

Chellapilla, K., et al., "Building segmentation based human-friendly human interaction proofs (HIPs)", *Lecture notes in computer science*, Human interactive proofs. International workshop No. 2, Bethlehem PA, (2005), 1-27.

Chellapilla, K., et al., "Computers beat Humans at Single Character Recognition in Reading based Human Interaction Proofs (HIPs).", *CEAS 2005*, Conference on Email and Anti-Spam 2005, (2005), 1-8.

Chellapilla, K., et al., "Designing human friendly human interaction proofs (HIPs)", *Proceedings of the SIGCHI conference on Human factors in computing systems*, (2005), 711-720.

Chellapilla, K., et al., "Using Machine Learning to Break Visual Human Interaction Proofs (HIPs)", *Advances in Neural Information Processing Systems 17, Neural Information Processing Systems (NIPÂ?2004)*, (2004), 1-8.

Chew, M., et al., "Image Recognition CAPTCHAs", EECS Department, University of California, Berkeley, Technical Report No. UCB/CSD-04-1333 2004, (2004), 1-19.

Coates, A., et al., "Pessimal Print: A Reverse Turing Test", *Proceedings of the Sixth International Conference on Document Analysis and Recognition (ICDAR)*, 2001, 1-5.

Imberman, Susan P., et al., "Three fun assignments for an Artificial Intelligence Class", *Journal of Computing Sciences in Colleges*, 21(2), (2005), 113-118.

Naor, Moni, "Verification of a human in the loop or Identification via the Turing Test", Unpublished draft from http://www.wisdom.weizmann.ac.il/~naor/PAPERS/_human.abs.html, (1996).

Von Ahn, Luis, et al., "CAPTCHA: Using Hard AI Problems for Security", *Proceedings of Eurocrypt*, (2003), 294-311.

Von Ahn, Luis, et al., "Telling Humans and Computers Apart", *Communications of the ACM*. 47(2), Feb. 2004 , 57-60.

*Microsoft Press Computer Dictionary, Third Edition*, The Comprehensive Standard for Business, School, Library, and Home,(1997).

"International Search Report—PCT/US04/25695", (date mailed Mar. 21, 2005),9 pages.

"International Search Report—PCT/US03/20457", (date mailed Oct. 3, 2003), 4 pages.

Baird, Henry S., et al., "Protecting Websites with Reading-Based CAPTCHAs", *2nd International Web Document Analysis Workshop (WDA'03)*, (Aug. 3, 2003),53-56.

Chew, Monica , et al., "BaffleText: a human interactive proof (5010-40)", *Document recognition and retrieval-Annual conference; 10th Proceedings SPIE The International Society for Optical Engineering*, (2003) ,305-316.

Courter, Gini , et al., *Mastering Microsoft (R) Office 2000 Professional Edition*, San Francisco : Sybex Inc.,(1999),pp. 5-7, 70-71, 151-157.

Matthias, Colin E., et al., "Blocking Techniques Against Malicious Robots", *Major Qualifying Project Report submitted to the Faculty of the Worcester Polytechnic Institute*, (Mar. 7, 2003),1-39.

Simard, Patrice Y., "Using Character Recognition and Segmentation to Tell Computer from Humans", *Proceeding of the Seventh International Conference on Document Analysis and Recognition*, (Aug. 3-6, 2003),418-423.

Spice, Byron , "Robot Solves Internet Robot Problem", Pittsburgh Post-Gazette, http://www.postgazette.com/healthscience/20011021blumside1021p4.asp,(Oct. 21, 2001),3 pages.

(56) References Cited

OTHER PUBLICATIONS

The CAPTCHA Project, et al., "Telling Humans and Computers Apart (Automatically)", http://www.captcha.net/, (2000), 8 pages.

Von Ahn, Luis, "Telling Humans and Computers Apart (Automatically) or How Lazy Cryptographers do AI", *Communications of the ACM*, 47(2), (Feb. 2004), 56-60.

"U.S. Appl. No. 10/863,609, Appeal Brief filed Mar. 19, 2008", 24 pgs.

"U.S. Appl. No. 10/863,609, Decision on Appeal Brief mailed May 30, 2008", 14 pgs.

"U.S. Appl. No. 11/533,250, Non-Final Office Action mailed Aug. 18, 2009", 25 pgs.

"U.S. Appl. No. 11/533,250, Notice of Allowance mailed Mar. 23, 2010", 9 pgs.

"U.S. Appl. No. 11/533,250, Response filed Nov. 18, 2009 to Non Final Office Action mailed Aug. 18, 2009", 13 pgs.

"U.S. Appl. No. 11/679,527, Examiner Interview Summary mailed Mar. 11, 2010", 4 pgs.

"U.S. Appl. No. 11/679,527, Examiner Interview Summary mailed Mar. 24, 2009", 2 pgs.

"U.S. Appl. No. 11/679,527, Final Office Action mailed Jan. 15, 2009", 15 pgs.

"U.S. Appl. No. 11/679,527, Non-Final Office Action mailed Aug. 21, 2009", 14 pgs.

"U.S. Appl. No. 11/679,527, Response filed May 15, 2009 to Final Office Action mailed Jan. 15, 2009", 10 pgs.

"U.S. Appl. No. 11/679,527, Response filed Sep. 25, 2008 to Non-Final Office Action mailed Mar. 25, 2008", 13 pgs.

"U.S. Appl. No. 11/906,632, Non Final Office Action mailed Dec. 14, 2010", 10 pgs.

"International Application Serial No. PCT/US2008/002208, International Search Report and Written Opinion mailed Aug. 18, 2008", 13 pgs.

"The Chaptcha Project: Telling Humans and Computers Apart (Automatically)", [Online]. Retrieved from the Internet: <URL: http://web.archive.org/web/20020529145520/http://www.captcha.net/>, (Archived May 29, 2002), 3 pgs.

Adnan, Masood, "15 Seconds : Fighting Spambots with NET and AI", [Online]. Retrieved from the Internet: <URL: http://www.15seconds.com/Issue/040202.htm>, (Feb. 2, 2004), 16 pgs.

"U.S. Appl. No. 11/906,632, Non Final Office Action mailed May 17, 2011", 8 pgs.

"U.S. Appl. No. 11/906,632, Response filed Dec. 29, 2011 to Non Final Office Action mailed Aug. 31, 2011", 12 pgs.

"U.S. Appl. No. 10/863,609 Decision on Appeal mailed Jul. 5, 2011", 11 pgs.

"U.S. Appl. No. 11/906,632, Final Office Action mailed Mar. 15, 2012", 7 pgs.

"U.S. Appl. No. 12/848,895, Response filed May 17, 2012 to Non Final Office Action mailed Feb. 22, 2012", 11 pgs.

"U.S. Appl. No. 12/848,895, Non Final Office Action mailed Feb. 22, 2012", 12 pgs.

"U.S. Appl. No. 12/848,895, Preliminary Amendment filed Sep. 29, 2010", 9 pgs.

"International Application Serial No. PCT/US07/18907, International Preliminary Report on Patentability mailed Mar. 12, 2009", 7 pgs.

"International U.S. Serial PCT/US2008/002208, International Preliminary Report on Patentability mailed Sep. 11, 2009", 9 pgs.

"International Application Serial No. PCT/US2008/002208, International Search Report mailed Aug. 18, 2008", 5 pgs.

"International Application Serial No. PCT/US2008/002208, Written Opinion mailed Aug. 18, 2008", 6 pgs.

"U.S. Appl. No. 11/906,632, Response filed Jun. 13, 2012 to Final Office Action mailed Mar. 15, 2012", 12 pgs.

"U.S. Appl. No. 11/906,632, Non Final Office Action mailed Feb. 20, 2013", 9 pgs.

"U.S. Appl. No. 11/906,632, Response filed May 20, 2013 to Non Final Office Action mailed Feb. 20, 2013", 14 pgs.

"U.S. Appl. No. 12/848,895, Notice of Allowance mailed Aug. 21, 2012", 6 pgs.

* cited by examiner

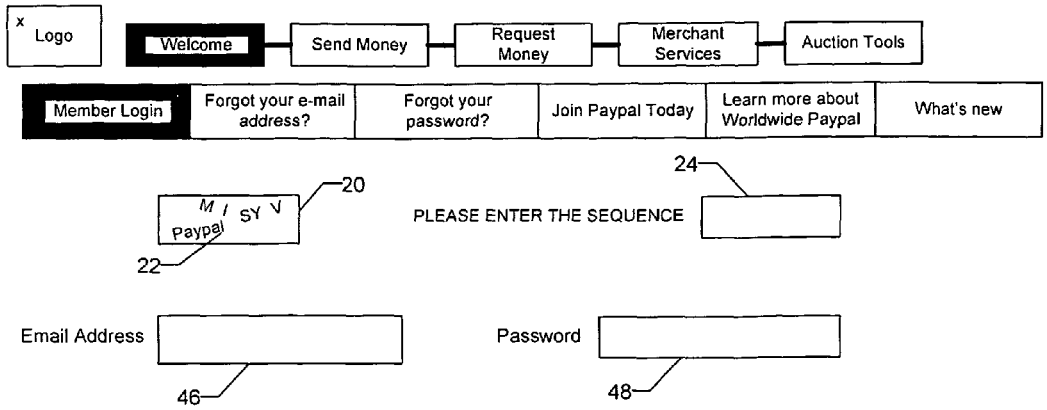
FIGURE 10
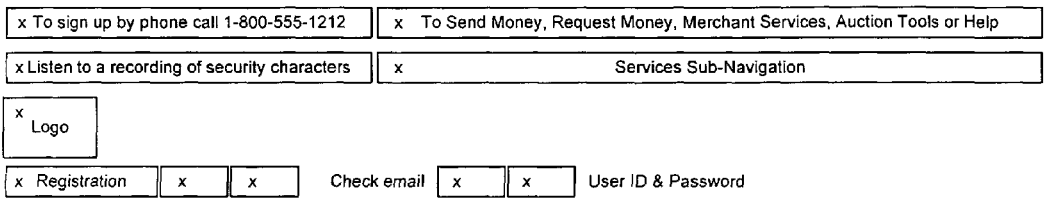
FIGURE 11
| Position | Timestamp (32bit) | Checksum (32bit) | Count (8bit) | Age (minutes calculated) | |
|---|---|---|---|---|---|
| 0 | 1020383681 | 2341234 | 1 | 49.1 | ACCEPT |
| 1 | 1020383682 | 2987347 | 1 | 169.1 | Max age exceeded - OVERWRITE |
| 2 | 1020383683 | 779283 | 255 | 0 | Max tries exceeded - DENIED, send alert, no increment |
| 3 | 1020383684 | 2877 | 1 | 60 | ACCEPT |
| 4 | 1020383685 | 347089 | 2 | 3.3 | ACCEPT - just one more time |
| 5 | 1020383686 | 293472938 | 1 | 55.8 | ACCEPT |
| 6 | 1020383687 | 20398478 | 4 | 16.5 | Max tries exceeded - DENIED and count increment |
| 7 | 1020383688 | 2094 | 1 | 1645.8 | Max age exceeded - OVERWRITE |
| 8 | 1020383689 | 0 | 3 | 0.3 | Max tries exceeded - DENIED and count increment |
| 9 | 1020383690 | 845733 | 0 | 0.9 | ACCEPT - space still initialized |
| 10 | 1020383691 |  | 1 | 1.5 | ACCEPT |
FIGURE 12

CONTEXTUAL VISUAL CHALLENGE IMAGE FOR USER VERIFICATION

TECHNICAL FIELD

The present application relates generally to the technical field of access security within a computer environment and, in one specific example, to the generation of a contextual visual challenge image to be presented as part of a challenge-response to verify that a user is human.

BACKGROUND

A problem that often arises in an Internet environment is that of unauthorized or improper access to websites by robots, commonly referred to as "bots". Bots are programs that are run on computers that automatically access a website without the need for human or user interaction. Although some bots may access a website for proper purposes, e.g., search engine spiders that are authorized to scrape information from web pages, other bots perform improper functions. For example, certain bots access websites and register multiple fictitious users for improper purposes, access websites to mine confidential user information, guess user passwords, list items without authorization on sale or auction websites, and so on. It will be appreciated that, due to the high processing power of computers running bots, a large number of unauthorized accesses may take place in an extremely short period of time. However, although unauthorized access by a user or human may still occur, it is a substantially slower process.

In order to avoid access by bots, websites may present an image-based test or CAPTCHA (Completely Automated Public Turing test to tell Computers and Humans Apart) to a user wherein the user is required to identify glyphs, (e.g., characters, numerals and/or symbols) in the image. The user is then requested to enter the glyphs manually and a comparison is then performed to check if the manually entered glyphs match those provided in the image presented to the user (e.g., the characters and numbers match the characters and numbers entered by the user). It will be appreciated that the image presented to the user should be arranged in such a fashion so as to inhibit recognition thereof by a robot (aka, a bot).

A frequently noted method to bypass this automation prohibition is to circumvent this image-based test to tell computers and humans apart. In such a method the test is simply moved outside the specific environment running the automation sequence to a manual process. This method is simplified by the relative ease of moving an image outside of the context and specific environment for which its authors/creators intended.

For example, a party intent on committing fraud and utilizing information obtained through an automated process protected by an image based test may lift that test onto their own interface and use external labor (e.g., human operators employed by them) to solve the tests for them. Recombined with the answers to these tests the automated process could continue past the testing point unabated. As the typical implementation and environment of an image-based test are often unidentifiable, the external laborer would not necessarily comprehend that they are aiding in illicit activity.

Another alternative is a website approach where unsuspecting users are given an image-based test in order to receive a perceived benefit or service. For example where a user is requested to enter sweepstakes to win a prize or to proceed to a next group of pictures by simply answering a visual challenge presented by the image based test, where the image-based test was actually lifted from another completely unrelated website as part of a traditional test.

BRIEF DESCRIPTION OF THE DRAWINGS

Some embodiments are illustrated by way of example and not limitation in the figures of the accompanying drawings in which:

FIG. 10 shows a schematic representation of an example user interface presented to the user on the computer;

FIG. 11 shows an example user interface for a visually impaired user;

FIG. 12 shows an example table for monitoring repetitive use of a token;

DETAILED DESCRIPTION

Figure 1:
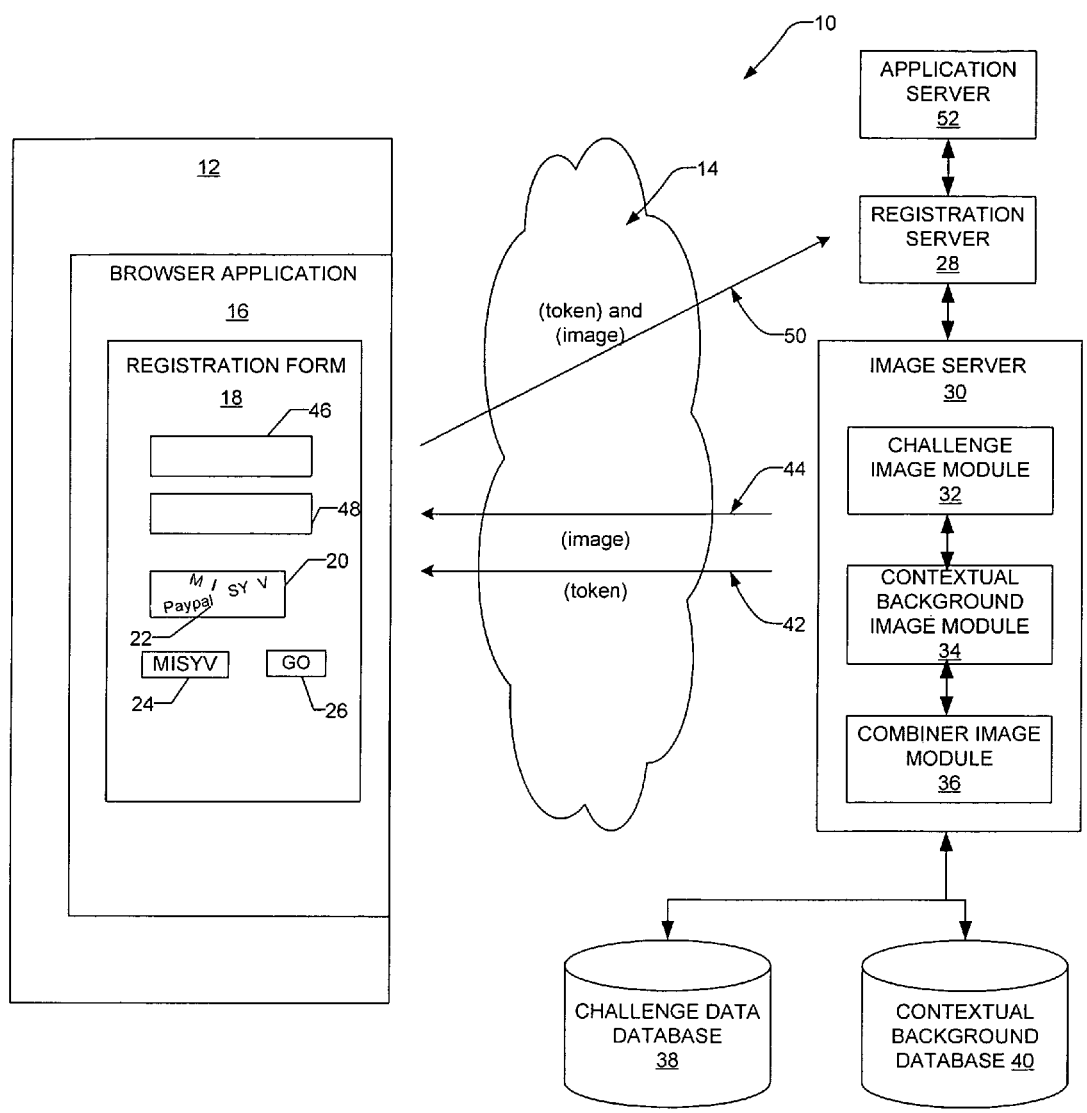
FIG. 1 is a schematic block diagram of system in accordance with an example embodiment.

Example methods and systems to generate a contextual visual challenge image to be presented to a user to verify that the user is human are described. In the following description, for purposes of explanation, numerous specific details are set forth in order to provide a thorough understanding of example embodiments. It will be evident, however, to one skilled in the art that the present invention may be practiced without these specific details.

In one example embodiment an image, e.g. a contextual visual challenge image, is provided to a user as part of an image-based test or CAPTCHA (Completely Automated Public Turing test to tell Computers and Humans Apart) to verify that the user is human. The image is generated by combining two graphics or images in the example forms of a visual challenge and a contextual background. The visual challenge includes a reference sequence in the form a multiple distorted and modified glyphs which the user has to identify and enter into a data field to complete the image-based test or CAPTCHA test. The contextual background is contextual to a specific environment and associates the visual challenge with the specific environment.

The contextual background of the image allows a user to associate the visual challenge with a specific environment. In circumstances where a party, intent on committing fraud, lifts these tests onto their own interfaces and uses external laborers to solve the tests, the external laborers may be aware that their actions are illegal as they may identify trademarks or logos associated with the environment in the contextual background. Also, in circumstances where unsuspecting users are given a lifted test to receive a perceived benefit or service, the unsuspecting users may also be provided notice and comprehend that their actions may form part of illicit and/or fraudulent activity, as the contextual background indicates that the image-based test is out of place. The unsuspecting users may in these circumstances alert service providers associated with the specific environment, e.g., the owners of the trademarks, service marks or logos.

The party intent on committing fraud may further infringe intellectual property rights of the service providers by posting the contextual visual challenge image with trade marks, service marks, logos or copyrighted images onto their websites. Architectitre Referring in particular to FIG. 1, reference numeral 10 generally indicates a system, in accordance with an example embodiment, to generate an image, e.g., contextual visual challenge image, to be presented to a user to verify that the user of a computer 12 is human. In one example embodiment, the system 10 is used in an Internet environment where a user accesses a website of an Internet service facility. Accordingly, in one example embodiment the description relates to a user registration process via the Internet 14. However, it would be appreciated that the system may find relevance in any computer environment in which user interaction with the computer 12 is to be verified. Some examples of other computer environments where the system may find relevance are portal environments or application environments. An example of an application environment is an on-line application environment provided by an application of a provider, which may be similar to the example of FIG. 1.

The computer 12 includes a web browser application 16, which generates a user interface, such as an example registration form 18. The registration form 18 includes a predefined image area 20 for displaying the contextual visual challenge image 22. The predefined image area 20 is where the image 22 to be presented to the user is displayed. In order to effect registration, a user is required to read the random contextual visual challenge image 22 from the image area 20 and enter a sequence identified into a user data input field 24. In order to complete registration, the user activates a "GO" button 26 which then communicates the registration information to a registration server 28.

As described in more detail below, the image 22 is generated by combining a visual challenge and a background image that is contextual to a specific environment. The visual challenge is generated by distorting and modifying a plurality of randomly selected glyphs, forming a reference sequence, by randomizing spacing, placement, font type, font size, glyph orientation or vertical offset of the glyphs. These distortions and modifications may be used to inhibit the acquisition of the visual challenge by an automated process, such as a software robot using optical character recognition (OCR). This visual challenge is used, as part of a challenge-response to determine that a user is human and not a robot.

The contextual visual challenge image 22 is sufficiently clear so that the user may read the visual challenge, in combination with the contextual background, identify the contextual background as a contextual background, and then to enter the corresponding glyphs of the reference sequence of the visual challenge into the input data field 24. Thus, in order to effect registration, human interaction with the computer 12 is required.

In one example embodiment, the contextual visual challenge image 22 is generated by an image server 30. As shown in FIG. 1, the image server 30 may comprise a challenge image module 32, a contextual background module 34 and a combiner image module 36. These modules themselves are communicatively coupled (e.g., via appropriate interfaces) to each other and to various data sources, (e.g. a challenge data database 38 and a contextual background database 40) so as to allow information to be passed between the modules or so as to allow the applications to share and access common data.

The challenge image module 32 is to generate the visual challenge which is to be presented to a user as part of a challenge-response. This challenge-response is used to verify that the user is human and not a robot using OCR to gain access to the website. The visual challenge may be an image-based test to which a response is provided by the user. An example of an image-based test is a CAPTCHA test, wherein the visual challenge may be a sequence of glyphs (e.g. characters, numbers and/or symbols). It will be appreciated that other image-based tests may be employed, such as a visual pattern recognition problem (e.g. requesting a response to find a correlation between symbols in two different figures) or a test in which several different images that mostly include the same subject are distorted, displayed and a user is prompted to identify the subject.

The example embodiments described below all relate to visual challenges that include a reference sequence of modified glyphs, but the present application is not limited to such a visual challenge and may employ the visual challenges mentioned above, or combinations thereof.

In one example embodiment, the challenge image module 32 is to generate a glyph-based visual challenge by randomly selecting a number of glyphs. The randomly selected glyphs are the basis of the visual challenge and form a reference sequence to be checked against the response of the user. The challenge image module 32 randomizes at least one of a spacing, placement, font type, font size, glyph orientation or vertical offset of each of the glyphs of the reference sequence, thereby to form a distorted and modified reference sequence in the form of a visual challenge.

The background image module 34 is to identify a contextual background that is contextual to a specific environment. As mentioned, the specific environment may be any one of a group of environments including a website environment, a portal environment or an application environment, the application environment in one example being an on-line application environment provided by an application of a provider. For example, the environment may be an online payment environment (e.g., PayPal.com), a banking registration environment or a download portal for documents. Each environment has a context which may be evident from identifiers associated with the environment.

An environment identifier may be at least one of a group of identifiers including a name, logo, service mark, trademark and copyrighted image associated with the environment. For example, the environment identifier for the Paypal payment environment may be any Paypal logo, service mark or trademark. The image server 30 may present the contextual background as a watermark to the visual challenge.

The background image module 34 is to select an environment identifier from the contextual background database 40 and is further to select a number of times the environment identifier is to be presented in the contextual background on the predefined image area 20. The background image module 34 may also select a random size for a presentation of the environment identifier, select a random location for the presentation of the environment identifier, select a random orientation for the presentation of the environment identifier and distribute the presentation of the environment identifier in the predefined image area 20. It will be appreciated that, depending on the application, all of the above functions may be performed by the background image module 34, or that only a selection of the functions may be performed to generate the contextual background.

In certain embodiments, the background image module 34 may determine the location of the visual challenge in the predefined image area 20 prior to selecting a random location for the presentation of the environment identifier. This may be done in applications where the presentation of the environment identifier is not to be obscured by the visual challenge.

The combiner image module 36 is to combine the visual challenge and the contextual background into a contextual visual challenge image which is to be presented to the user in the specific environment. The contextual background associates the visual challenge with the specific environment. The combiner image module 36 may first retrieve a visual challenge from the challenge image module 32 and a contextual background from the background image module 36.

In some example embodiments, the combiner image module 36 may also be used to select a color or color arrangement for the visual challenge and for the contextual background. This feature may be advantageous to identify a color combination that would make it even more difficult for a bot to distinguish between the contextual background and the visual challenge.

In an example embodiment, the process of generating a contextual visual challenge image is initiated when the web browser application 16 requests a registration form from an application server 52. The application server 52, registration server 28 and image server 30 are communicatively coupled (e.g., via appropriate interfaces) to each other. Once the registration form is requested, the application server 52 corresponds with the image server 30 to request the generation of a reference sequence.

After the reference sequence is generated by the challenge image module 32 of the image server 28, it is passed, e.g., in the form of a token, via the Internet 14 to the browser application 16 as shown by arrow 42. After the combiner image module 36 has generated the image 22, the image server 28 communicates it, as shown by arrow 44, to the browser application 16 for inclusion in the predefined image area 20. After the user has entered the characters, numbers and/or symbols to identify the visual challenge into the user data input field 24, and completed other details in the registration form, e.g. completed details in fields 46, 48, the token and the user input data in the user data input field 24 are then communicated to the registration server 28, as shown by arrow 50. The registration server 28 then decrypts the token to obtain the reference sequence, and then compares the sequence entered by the user with the reference sequence and, if the sequences match, the registration server 28 may authenticate the user. However, in addition to comparing the two sequences, the registration server 28 also performs a checksum validation and time stamp analysis of the token, as described in more detail below.

Data Structures

Figure 2:
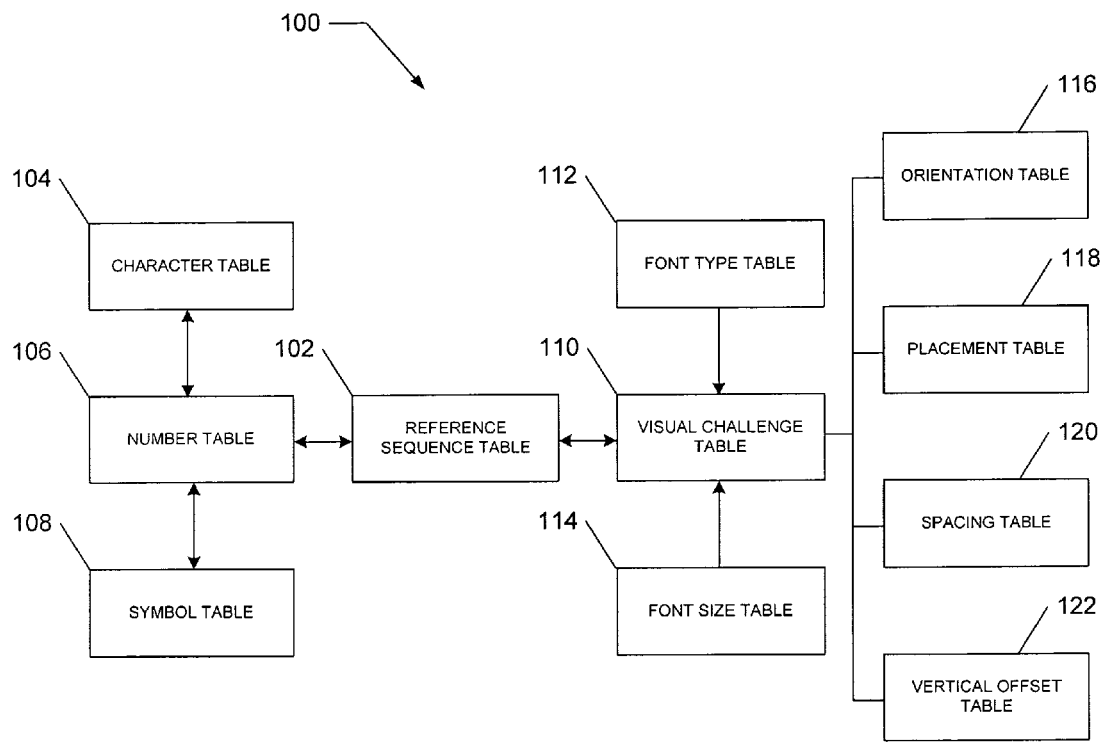
FIG. 2 shows a high-level entity-relationship diagram illustrating tables that may be maintained within a challenge data database, in accordance with an example embodiment.

FIG. 2 is a high-level entity-relationship diagram, illustrating various tables 100 that may be maintained within the challenge data database 38, and that are utilized by and support the challenge image module 32. A reference sequence table 102 contains a record of reference sequences generated by the challenge image module 32, and may include time/stamp information pertaining to each reference sequence.

The tables 100 also include a character table 104 in which are maintained all characters that may be selected to generate a visual challenge. Likewise, a number table 106 and symbol table 108 maintain respectively all numbers and symbols that may be selected to generate a visual challenge. It will be appreciated that the items in the character table 104, number table 106 and symbol table 108 may be maintained not to include characters, numbers or symbols that may be too difficult to recognize by a human once distorted or modified. For example, punctuation marks such as "." or "," may be excluded from the symbol table 108.

Multiple glyphs, e.g. characters, numbers and/or symbols are selected from the character table 104, number table 106 and symbol table 108 randomly, to form the reference sequence stored in the reference sequence table 102.

A visual challenge table 110 contains a record of visual challenges generated by the challenge image module 32, e.g., the reference sequences after they have been distorted and modified and may also include time/stamp information pertaining to each reference sequence. A font type table 112 contains records of the different font types that may be used to randomly modify each glyph in a reference sequence to form a visual challenge. In one embodiment, the font sets are handmade by humans and stored in a font library for retrieval each time a font is requested. Each font set may comprise a plurality of font images as described in more detail below. Similarly, a font size table 114 contains the allowable font sizes that may be used to size each glyph that forms part of the reference sequence. Other tables, such as an orientation table 116, placement table 118, spacing table 120 and vertical offset table 122 respectively contain information on the parameters to randomly select the orientation of a glyph in a visual challenge, the placement of each glyph, the spacing between glyphs and the vertical offset of each glyph within the visual challenge.

Figure 3:
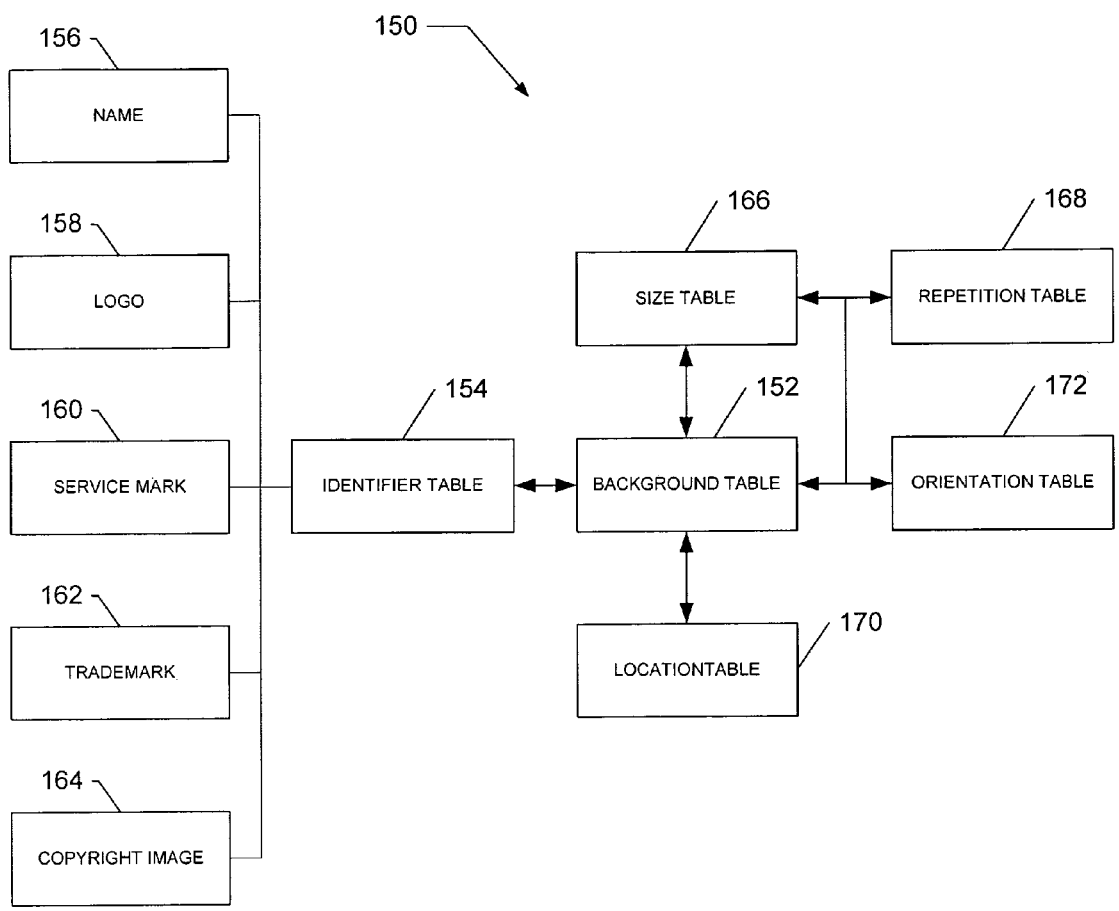
FIG. 3 shows a high-level entity-relationship diagram illustrating tables that may be maintained within a contextual background database, in accordance with an example embodiment.

FIG. 3 is a high-level entity-relationship diagram, illustrating various tables 150 that may be maintained within the contextual background database 40, and that are utilized by and support the contextual background module 34. A background table 152 contains a record of contextual backgrounds generated by the contextual background module 34. These records may include certain time/stamp information pertaining to the generation and/or use of each of the contextual backgrounds.

An identifier table 154 maintains information on the following identifier data groups: names 156, logos 158, service marks 160, trademarks 162 and copyright images 164.

Similar to the tables 100 that may be maintained within the challenge data databases 38, the tables 150 may also include a size table 166 to maintain information on the allowable sizes for the environment identifiers, a location table 168 to maintain information on the possible placements of the environment identifiers within the predefined image area 20 and an orientation table 170 to maintain information on the orientation of the environment identifiers in the contextual background. A repetition table 172 provides information on the number of times a particular environment identifier may be displayed. As the number of presentations may be closely related to the selected size of an identifier, the size table 166 and repetition table 168 may be linked.

Flowcharts

Figure 4:
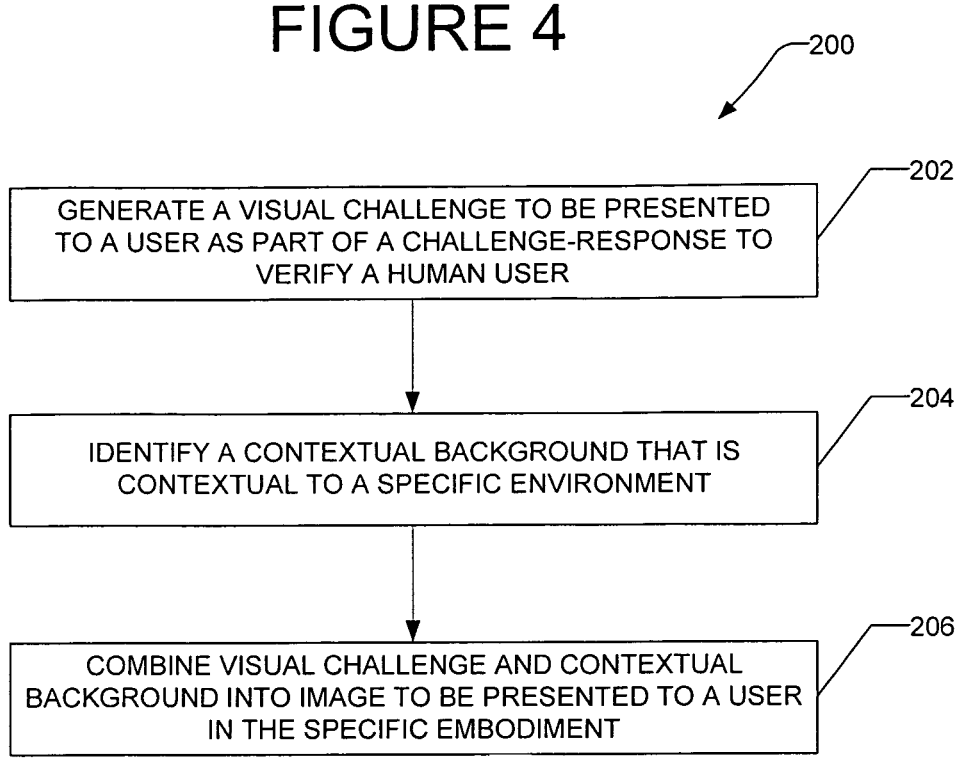
FIG. 4 shows a schematic flow diagram of a method, in accordance with an example embodiment, to generate a contextual visual challenge image.

In a method of generating a contextual visual challenge image, reference numeral 200 shown in FIG. 4, generally indicates an example embodiment of the method. In one embodiment, the method 200 is carried out in the image server 30.

In an example embodiment, the method 200 commences when the web browser application 16 requests a contextual visual challenge image from the image server 30. The challenge image module 32 generates, as shown in operation 202, a visual challenge to be presented to a user as part of a challenge-response, thereby to verify that the user of the computer 12 is human. In operation 204 the background image module 34 identifies a contextual background that is contextual to a specific environment. The combiner image module 36 combines, in operation 206, the visual challenge and the contextual background into the contextual visual challenge image which is to be presented to the user in the specific environment. As mentioned above, the contextual background associates the visual challenge with the specific environment.

Figure 5:
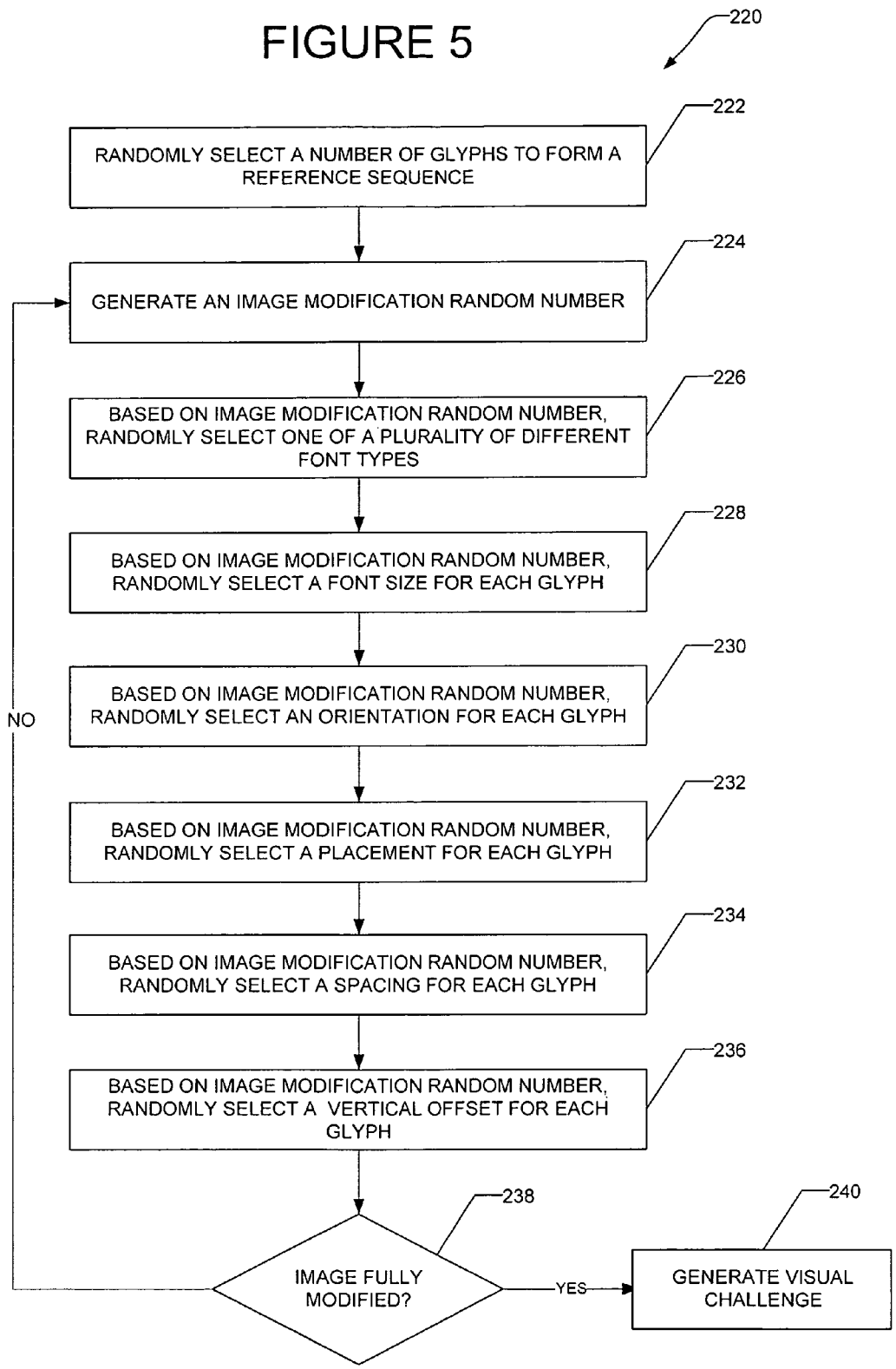
FIG. 5 shows a detailed schematic flow diagram of a method, in accordance with an example embodiment, to generate a visual challenge to be presented as part of a challenge-response to verify that a user is human.

Referring in particular to FIG. 5, reference numeral 220 generally indicates a method, in accordance with an example embodiment, of generating a visual challenge to be presented as part of a challenge-response to verify that a user is human. In one example embodiment, the method is carried out in the challenge creation module 32.

As shown in operation 222, a number of glyphs are randomly selected as a reference sequence. For example, the challenge image module 32 may randomly select characters, numbers and/or symbols from the character table 104, number table 106 and symbol table 108 of the challenge data database 38.

The challenge image module 32 now generates (in operation 224) an image modification random number and based on the image modification random number the visual challenge image is created by modifying the reference sequence comprising the randomly selected glyphs. For example, the image modification random number may be used randomly to select one of a plurality of different font types (see operation 226) kept in the font type table 110 of the contextual background database 40 for each glyph in the reference sequence thereby to inhibit the acquisition of the reference sequence by a robot. Similarly, the image modification random number may be used randomly to select a font size (from the font size table 112), orientation (from the orientation table 114), placement (from the placement table 116), spacing (from the spacing table 118) and vertical offset (from the vertical offset table 122), as shown in operation 228 to 236.

Once the visual challenge has been sufficiently distorted or modified (operation 238), the visual challenge is generated in operation 240 and it can be retrieved by the combiner image module 34 to be combined with an identified contextual background, as is described in more detail below.

Figure 6:
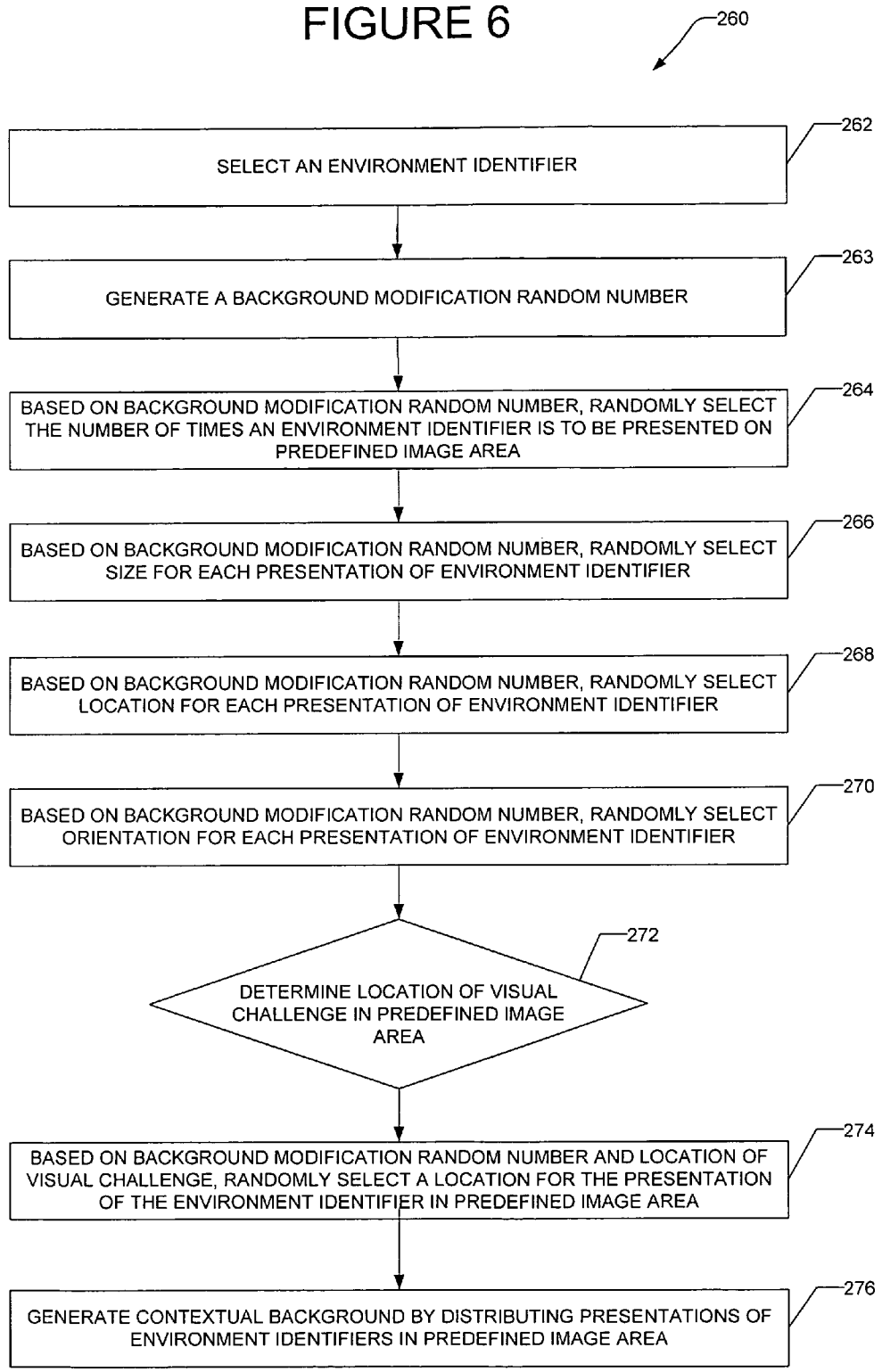
FIG. 6 shows a detailed schematic flow diagram of a method, in accordance with an example embodiment, of identifying a contextual background that is contextual to a specific environment.

Referring in particular to FIG. 6, reference numeral 260 generally indicates a method to identify a background that is contextually associated to a specific environment, in accordance with an example embodiment. In one embodiment, the method is carried out in the background image module 34.

In operation 262, an environment identifier is selected from the identifier table 154 (in the contextual background database 40) comprising name, logo, service mark, trademark and copyright image information. This selection may be random or according to certain environmental conditions.

In operation 263, a background modification random number is generated by the contextual background module 34. However, it will be appreciated that in other example embodiments, the challenge image module 32 may communicate the image modification random number it generated to the contextual background module 34 for further use. Alternatively, a separate module may generate random numbers that are to be provided to both the challenge image module 32 and the contextual background module 34.

The background image module 34 selects from the repetition table 168, and based on the background modification random number, a number of times the environment identifier is to be presented on the predefined image area 20 (operation 264).

It will be appreciated, that although the environment identifier may be randomly selected, the environment identifier may still be restricted to a particular flow or location within a flow. For example, the flow or particular webpage within a certain web-based process may be an environmental condition that plays a role in the random selection of the environment identifier. As is described in more detail below, with reference to FIGS. 22 and 23, certain environment identifiers may be best suited within a checkout or express checkout flow.

In operations 266 to 272 the background image module 34 randomly selects, from the tables 150 of the contextual background database 40 a random size for a presentation of the environment identifier and a random orientation for the presentation of the environment identifier. As is shown in operation 272, the background image module 34 may, prior to selecting a random location for the presentation of the environment identifier in operation 274, determine the location of the visual challenge in the predefined image area 20. The random selection of the variables set out above may all be based on the background modification random number. However, it will be appreciated that other methods of randomly selecting the variables may be used Having regard to all these variables, the background image module 34 generates in operation 276 the contextual background by distributing the presentation of the environment identifier in the predefined image area. The contextual background may then be identified by and retrieved by the combiner image module 36 to be combined with the visual challenge.

Figure 7:
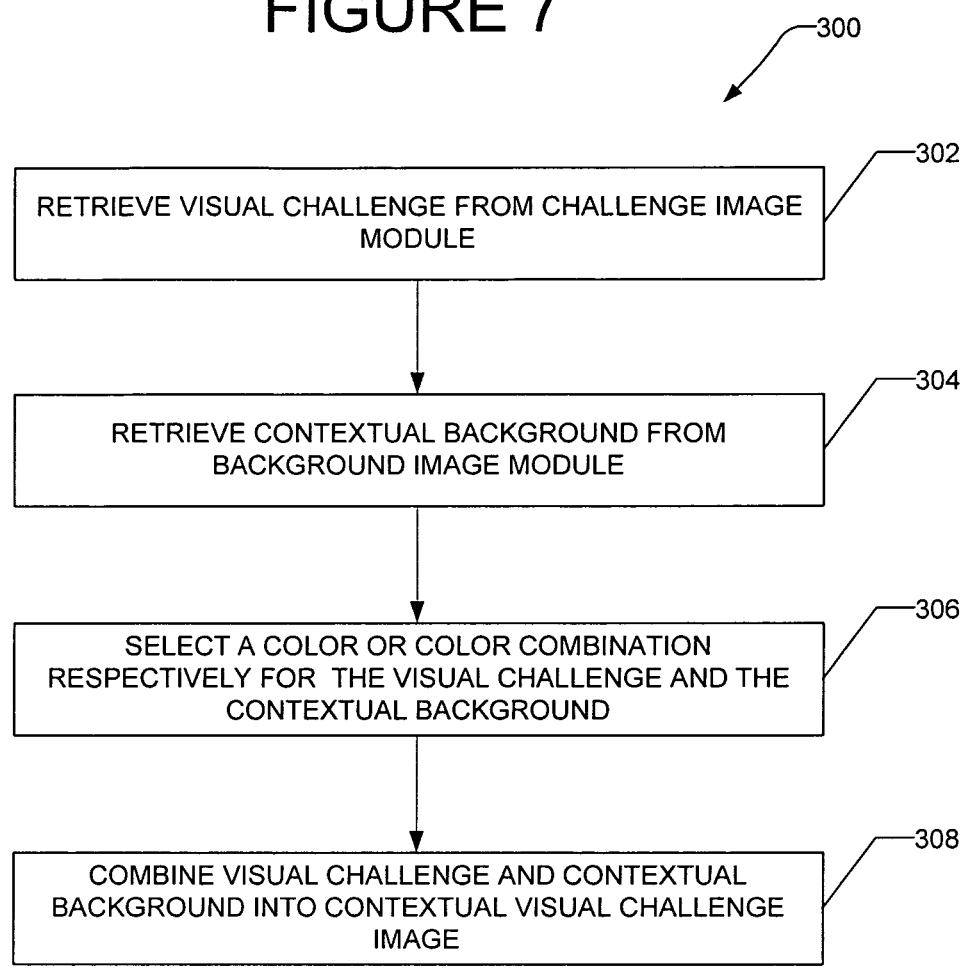
FIG. 7 shows a detailed schematic flow diagram of a method, in accordance with an example embodiment, to combine a visual challenge and a contextual background to generate the contextual visual challenge.

Referring in particular to FIG. 7, reference numeral 300 generally indicates a method, in accordance with an example embodiment, to combine the visual challenge and the contextual background into an image, e.g. the contextual visual challenge image, to be presented to the user in the specific environment. In one embodiment, the method is carried out in the combiner image module 36.

In operations 302 and 304, the combiner image module 36 retrieves the visual challenge from the challenge image module 32 and also retrieves the contextual background from the background image module 34. It will be appreciated that the combiner image module 36 may alternatively retrieve the visual challenge from the visual challenge table 110 of the challenge data database 38. Similarly, the combiner image module 36 may retrieve the contextual background from the background table 152 of the contextual background database 40.

The combiner image module 36 selects in operation 306 a color or color arrangement for respectively the visual challenge and for the contextual background, prior to combining the visual challenge and the contextual background (in operation 308) into an image to be presented to the user in the specific environment, with the contextual background associating the visual challenge with the specific environment.

Figure 8:
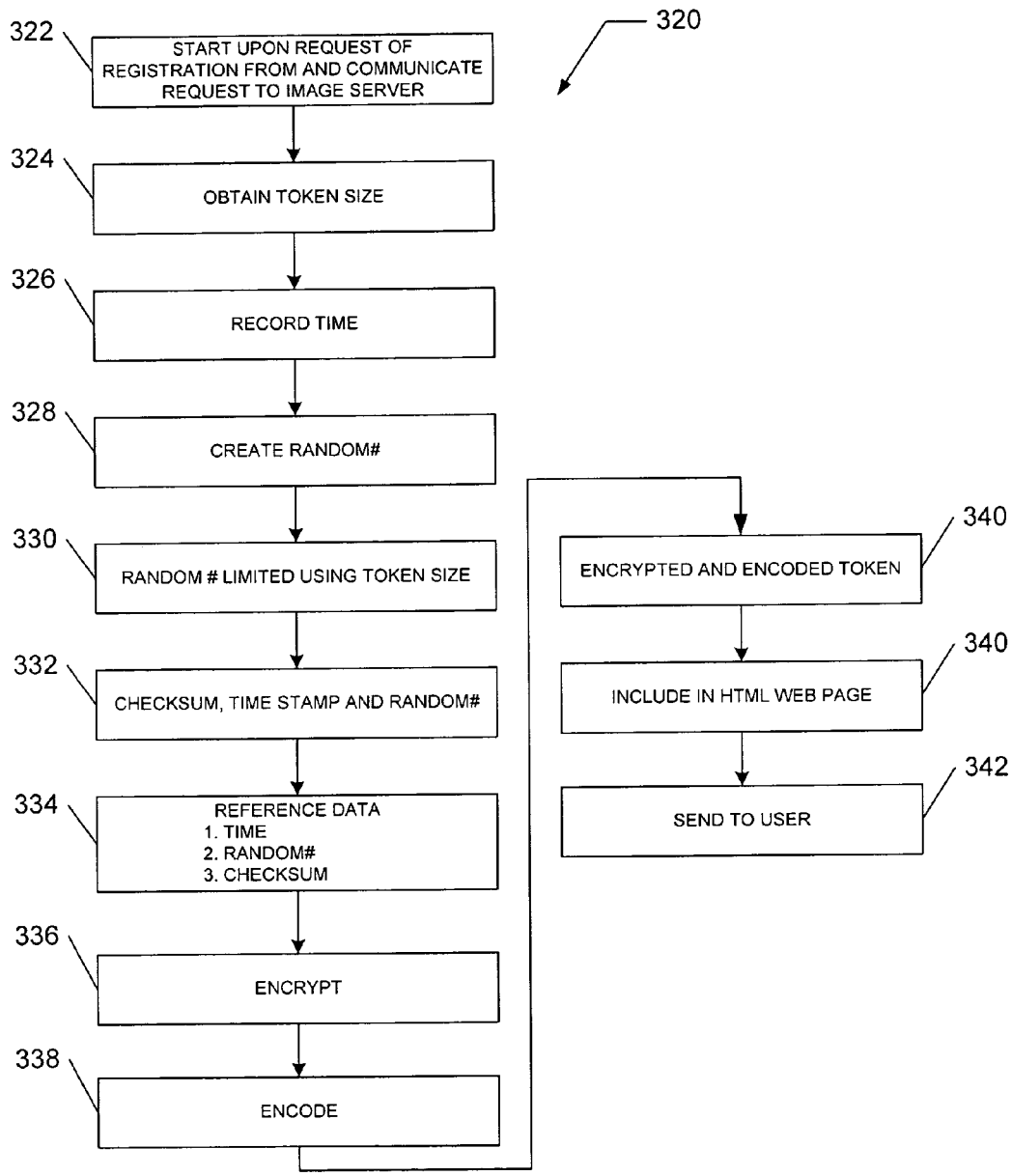
FIG. 8 shows a schematic flow diagram of a method, in accordance with an example embodiment, to generate reference data including a reference sequence.

Referring in particular to FIG. 8, reference numeral 320 generally indicates an example method for generating random reference data including a reference sequence, for use in verifying that a user is human.

As mentioned above, the browser application 16 displays the image 22 in the predefined image area 20 so that the user may identify the contextual background and visual challenge, read the visual challenge and identify the reference sequence provided therein. The user is then to manually enter the glyphs, corresponding to the reference sequence of the visual challenge, into the user data entry field 24 via a keyboard of the computer 12. Once the user has completed the entire registration form, the user typically activates the "GO" or a "SUBMIT" button 26 in response to which the browser application 16 communicates the user entered data, data entered into the form 18, and the token including the reference sequence to the registration server 28 as shown by arrow 50 in FIG. 1.

In an example registration process, the method 320 is initiated when the web browser application 16 requests a registration form from the application server 52 and this request is communicated to the image server 30 (see operation 322). Thereafter, as shown at operation 324, the particular token size, to convey the reference sequence in the system 10 is determined and is time stamped in milliseconds (see operation 326). The reference sequence (as described above and as shown in operation 328) is generated by randomly selecting a number of glyphs. The random reference sequence may in certain embodiments be limited in size (see operation 330) to conform to the token size selected at operation 324. A checksum of the time stamp and the reference sequence is then performed (see operation 332) to produce reference data including time data, the reference sequence, and the checksum (see operation 334), which is then encrypted, e.g. using Blowfish, as shown in operation 336. The encrypted reference data may then be Base64 encoded (operation 338) to produce an encrypted and encoded token (see operation 340) which is then included in an HTML web page (see operation 342) and sent to the user (see arrow 42 in FIG. 1).

An example of the token including the reference data generated by the image server 30 is as follows:

| (64 bit) | (32 bit) | (32 bit) |
|---|---|---|
| 1595139460 Time Stamp | MISYV Random Sequence | 59991 Checksum |

The time stamp of the token (see operation 326) indicates when the token was generated and, as described in more detail below, is used by the registration server 52 to determine whether or not the token has been used before in a valid registration process. The time stamp is typically the time on the image server 30 when the token was created.

Although in the embodiment described above, the token is communicated to the browser application 16 in an HTML web page, it is to be appreciated that it may also, in other embodiments, be passed in a cookie, in other forms, URLs, or the like. Further, the encryption of the token is typically by means of a private key and the random number is generated on-the-fly or dynamically when a request for the registration form 18 is received from the browser application 16. Accordingly, in one embodiment, no library of numbers or images is provided, and different reference data including the random sequence, is generated each time a request from the computer 12 is processed.

When the browser application 16 performs an image call to the image server 30 to retrieve the image 22 for display in the web page, the image server 30 will use the reference sequence it has already generated stored in the challenge data database 38, and which forms part of the generated token.

Figure 9:
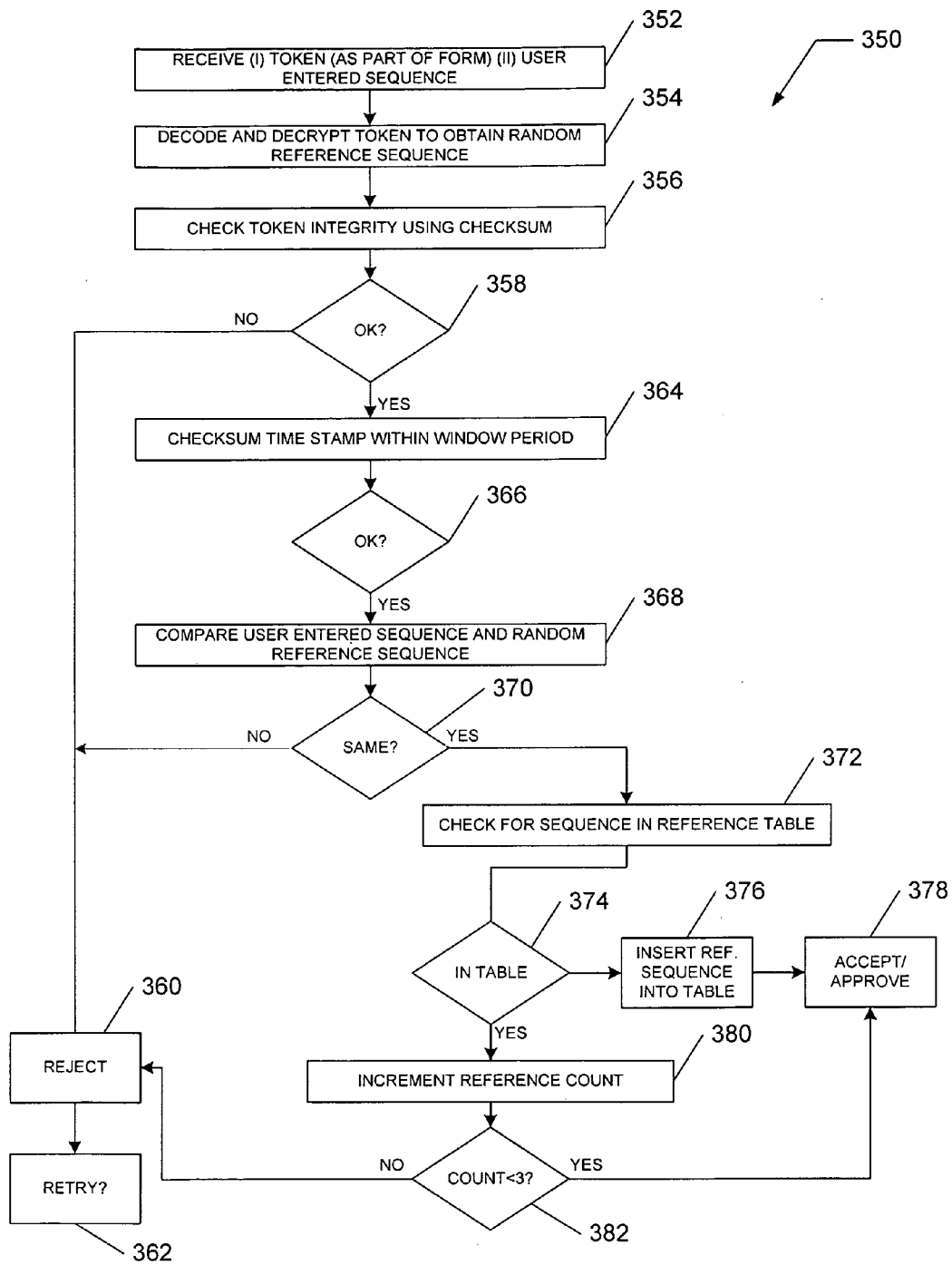
FIG. 9 shows a schematic flow diagram of a method, also in accordance with an example embodiment of the invention, to monitor user interaction with the computer.

Referring in particular to FIG. 9, reference numeral 350 generally indicates a method, in accordance with an example embodiment, for monitoring user interaction with the computer 12. As shown at block 352, in one embodiment the registration server 28 receives the token including the reference data, as part of the form 18, as well as the user entered sequence. The reference data of the token is then Base64 decoded and Blowfish decrypted to obtain the reference data including the random reference sequence (see operation 354). The integrity of the reference data is then checked using the checksum (see operation 356) and, as shown at decision operation 358, if the integrity of the reference data of the token is rejected (see operation 360), the user is then given a further opportunity of a limited number of opportunities (see operation 362) to re-enter the sequence which is shown in the image 22.

However, returning to decision operation 358, if the integrity of the reference data is accepted, then the time stamp of the token is checked to ensure that it is within a particular predetermined time range or window period as shown at block 364. In particular, and depending upon the amount of detail a user is required to enter into the registration form 18, a window period of about 10 seconds to 10 minutes is allowed during which the reference data of the token is valid. If the time stamp indicates a time period of less than about 10 seconds or a time period of more than about 10 minutes, it is assumed that the registration attempt is either by a robot, or a replay attack in which multiple registration attempts using the same token are attempted. Accordingly, as shown at decision block 366, if the time stamp of the token is not within the window period, the registration attempt is rejected (see operation 360).

However, if the time stamp is within the acceptable window period, the user-entered sequence is compared with the reference sequence to see if they match, as shown at operation 368. If the user entered sequence and the reference sequence do not match (see operation 370) then the registration attempt is rejected (see operation 360). In the embodiment depicted in the drawings in which the image server 30 performs the time stamping and the registration server 28 checks the time stamping, time on the servers 28, 30 is synchronized.

In certain circumstances, a user may inadvertently activate the "GO" button 26 more than once, for example, due to a slow refresh rate on a display screen. Thus, in certain embodiments, the reference data may be valid for more than one perceived registration attempt. In these circumstances, if the user entered sequence and the reference sequence match, a further check is conducted to determine if the same token has already been used as a basis for a registration validation (see operation 372). In particular, the method 120 accesses a table 400 (see FIG. 12) to obtain usage information on the token and its reference data. As shown at decision operation 374 in FIG. 9, if the number of the token is not included in the table 400, it is then inserted into the table 400 (see operation 376) and its reference count is set at "1" (see column 402 in FIG. 12). Thereafter, the registration process is authenticated or effected, as shown at operation 378.

However, returning to decision operation 374, if the reference sequence associated with the token is included in the table 400, its reference count included in column 402 is incremented (see operation 380) and the method 120 then checks to see if the count associated with the token exceeds a predetermined maximum number. For example, if the predetermined maximum number is three, then once the count in the table 400 has reached three, any registration attempt after that using the same reference number is rejected (see operation 382 and 360 in FIG. 9). If, however, the account is less than three, then the registration process may be completed (see operation 378).

In certain embodiments, the table 400 includes an age column 404, which is used to check whether or not the time stamp is within the predetermined window period (see operation 364). A registration attempt may be selectively rejected dependent upon the count in column 380 and the age of the token as shown in column 404. Comments 406 in FIG. 12 show an exemplary application of the methodology described above in which the time window is 120 minutes and the maximum number of retry attempts using the same reference data is three.

In the embodiments described above, the servers 28, 30 and 52 are shown as separate servers, which may be located at different facilities. Thus, in one embodiment, the token communicated between the different servers may be the only interaction between the servers 28, 30 and 52. In this embodiment, a single centralized table 400 may be provided on the server 28 and it need not be replicated on the servers 30 and 52. However, it will be appreciated that in other embodiments, any two or more of the servers may be combined into a single server.

User Interfaces

An exemplary screen shot of an embodiment of a user interface served by the application server 52 to the browser application 16 is shown in FIG. 10. The user interface of FIG. 10 is typically generated using HTML and, as mentioned above, although one of the example embodiments describe the system with reference to a registration process, it may be used to monitor user interaction with the computer 12 in any other circumstances. As the image 22 is modified in such a fashion that it inhibits identification of the reference sequence by a robot or any other automated process, the resultant image 22 may be difficult for a visually impaired person to read. Accordingly, as shown in FIG. 11, an alternative sign up or registration procedure may be provided in which a toll free number 1-800-555-1212 is provided for a visually impaired person to call and thereby to effect registration. Another alternative sign up or registration procedure may be provided where a visually impaired person is provided with the option to listen to a recording of "security characters" such as the reference sequence.

In the embodiments described above, the servers 28, 30 and 52 are shown as separate servers, which may be located at different facilities. Thus, in one embodiment, the token communicated between the different servers may be the only interaction between the servers 28, 30, 52. In this embodiment, a single centralized table 400 may be provided on the server 28 and it need not be replicated on the servers 30 and 52. However, it will be appreciated that in other embodiments, any two or more of the servers may be combined into a single server.

Figure 13:
FIGS. 13 to 16 show example embodiments of visual challenges generated using the methods described herein.
Figure 14:
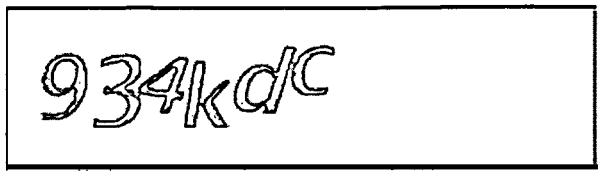
Figure 15:
Figure 16:

FIGS. 13 to 16 show various example embodiments of visual challenges generated according to the method of FIG. 5. FIG. 13 shows a reference sequence "XkFu7", comprising characters and numbers as glyphs which have been modified and distorted as described above thereby to form a visual challenge. Similarly FIG. 14 shows a visual challenge comprising a reference sequence "934kdc", FIG. 15 shows a visual challenge comprising a reference sequence "DS7u8" and FIG. 16 shows a visual challenge comprising a reference sequence "pmqR7".

Figure 17:
FIGS. 17 to 24 show example embodiments of images generated using the methods described herein.
Figure 18:
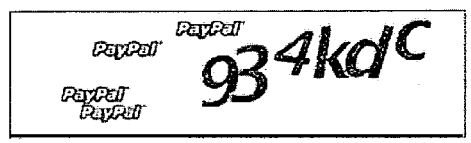
Figure 19:
Figure 20:
Figure 21:
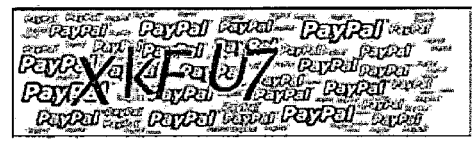
Figure 22:
Figure 23:
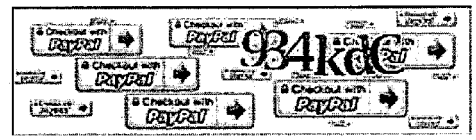
Figure 24:

FIGS. 17 to 24 show various example embodiments of contextual visual challenge images generated according to the example embodiment methods of FIGS. 4 to 7. FIG. 17 shows a visual challenge comprising a reference sequence "MX7J" and a contextual background which comprises various sizes of the Paypal name. The Paypal name appears in different locations, sizes and orientations in the predefined image area. Similarly, FIGS. 18 to 24 show contextual visual challenge images where the reference sequences used in the visual challenges of FIGS. 13 to 16 have been modified in different ways to form new visual challenges. Various contextual backgrounds are used in these figures, showing names, trademarks, service marks and logos. For example, FIG. 22 shows a visual challenge image with a reference sequence "xKFU7" on a contextual background which comprises the recognizable phrase "Pay with PayPal" as well as the express checkout trolley. This contextual visual challenge image would be best used in an express checkout flow. Similarly, the contextual visual challenge image would also be best used in the PayPal checkout environment.

Figure 25:
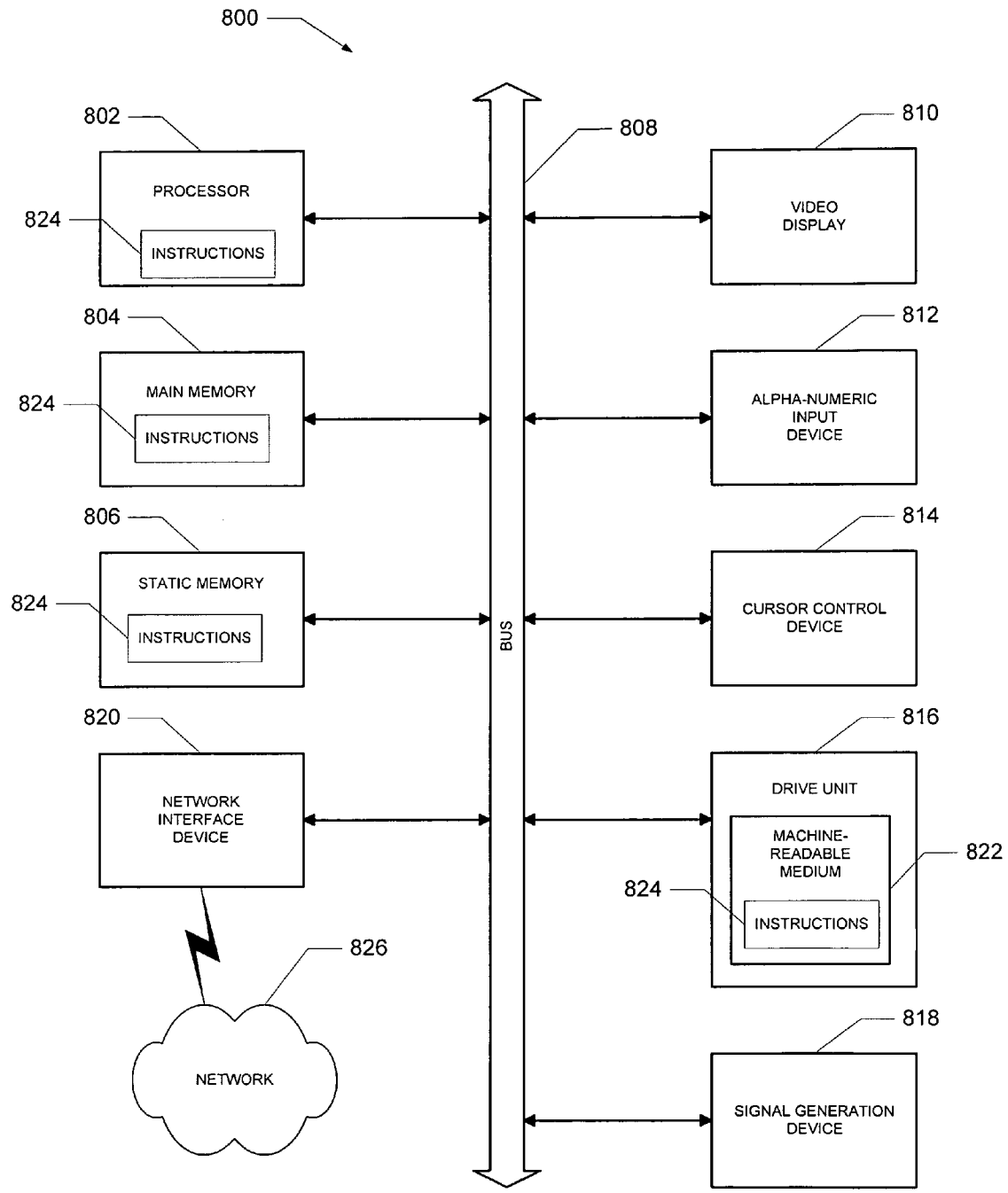
FIG. 25 shows schematic hardware architecture of an example computer for executing any one of the methods described herein.

FIG. 25 shows a diagrammatic representation of machine in the example form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to generate a contextual visual challenge image to be presented to a user to verify that the user is human have been described.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system comprising:
    at least one processor coupled to a memory;
    a challenge image module to generate, using the at least one processor, a visual challenge to be presented to a user as part of a challenge-response to verify that the user is human;
    a background image module to identify, using the at least one processor, a contextual background that is contextual to a specific environment associated with a service provider of a service for which the challenge-response is to be presented, the contextual background including multiple presentations of an environment identifier that comprises a symbol identifying the service provider the background image module further to select at least one of random sizes for the multiple presentations of the environment identifier, random locations for the multiple presentations of the environment identifier, and random orientations for the multiple presentations of the environment identifier; and
    a combiner image module to combine, using the at least one processor, the visual challenge and the contextual background into an image which is to be presented to the user in the specific environment, the contextual background associating the visual challenge with the specific environment.

2. The system of claim 1, wherein the visual challenge is an image-based test to which the response is provided by the user.

3. The system of claim 2, wherein the specific environment is any one of a group of environments including a website environment, and a portal environment.

4. The system of claim 2, wherein the specific environment is an application environment.

5. The system of claim 4, wherein the application environment is an on-line application environment provided by the service provider.

6. The system of claim 1, wherein the environment identifier is at least one of a group of identifiers including a name, logo, service mark, trademark and copyrighted image associated with the environment.

7. The system of claim 1, wherein the contextual background is a watermark to the visual challenge.

8. The system of claim 1, wherein the challenge image module is to generate the visual challenge by modifying a plurality of randomly selected glyphs by randomizing at least one of a spacing, placement, font type, font size, glyph orientation or vertical offset of each of the glyphs.

9. The system of claim 1, wherein the background image module is to:
    select the environment identifier; and
    select a number of times the environment identifier is to be presented on a predefined image area.

10. The system of claim 9, wherein the background image module is to:
    select the random size for each presentation of the environment identifier;
    select the random location for each presentation of the environment identifier;
    select the random orientation for each presentation of the environment identifier; and
    distribute the multiple presentations of the environment identifier in the predefined image area.

11. The system of claim 9, wherein the background image module is to determine the location of the visual challenge in the predefined image area prior to selecting the random locations for the multiple presentations of the environment identifier.

12. The system of claim 11, wherein the combiner image module is to select a color or color arrangement for the visual challenge and for the contextual background.

13. The system of claim 11, wherein the background image module is to determine the random locations of the multiple presentations of the environment identifier such that the multiple presentations of the environment identifier are not obscured by the visual challenge.

14. A method comprising:
    generating a visual challenge to be presented to a user as part of a challenge-response to verify that the user is human;
    identifying a contextual background that is contextual to a specific environment associated with a service provider of a service for which the challenge-response is to be presented, the contextual background including multiple presentations of an environment identifier that comprises a symbol identifying the service provider, the background image module further to select at least one of random sizes for the multiple presentations of the environment identifier, random locations for the multiple presentations of the environment identifier, and random orientations for the multiple presentations of the environment identifier; and using one or more processors, combining the visual challenge and the contextual background into an image which is to be presented to the user in the specific environment, the contextual background associating the visual challenge with the specific environment.

15. The method of claim 14, wherein the visual challenge is an image-based test to which the response is provided by the user.

16. The method of claim 15, wherein the specific environment is any one of a group of environments including a website environment and a portal environment.

17. The method of claim 14, wherein the specific environment is an application environment.

18. The method of claim 17, wherein the application environment is an on-line application environment provided by an application of the service provider.

19. The method of claim 14, wherein the environment identifier is at least one of a group of identifiers including a name, logo, service mark, trademark and copyrighted image associated with the environment.

20. The method of claim 19, wherein the contextual background is a watermark to the visual challenge.

21. The method of claim 20, wherein generating the visual challenge includes modifying a plurality of randomly selected glyphs by randomizing at least one of a spacing, placement, font type, font size, glyph orientation or vertical offset of each of the glyphs.

22. The method of claim 21, wherein identifying the contextual background includes automatically generating the contextual background.

23. The method of claim 22, wherein identifying the contextual background includes:
selecting the environment identifier and a number of times the environment identifier is to be presented on a predefined image area.

24. The method of claim 23, wherein identifying the contextual background includes:
selecting the random size for each presentation of the environment identifier;
selecting the random location for each presentation of the environment identifier;
selecting the random orientation for each presentation of the environment identifier; and
distributing the multiple presentations of the environment identifier in the predefined image area.

25. The method of claim 23, wherein selecting random locations for the multiple presentations of the environment identifier includes determining the location of the visual challenge in the predefined image area.

26. The method of claim 25, wherein selecting the random locations for the multiple presentations of the environment identifier includes determining the random locations of the multiple presentations of the environment identifier such that the multiple presentations of the environment identifier are not obscured by the visual challenge.

27. A non-transitory machine-readable medium embodying a set of instructions to instruct a machine to perform operations comprising:
generating a visual challenge to be presented to a user as part of a challenge-response to verify that the user is human;
identifying a contextual background that is contextual to a specific environment associated with a service provider of a service for which the challenge-response is to be presented, the contextual background including multiple presentations of an environment identifier that comprises a symbol identifying the service provider, the background image module further to select at least one of random sizes for the multiple presentations of the environment identifier, random locations for the multiple presentations of the environment identifier, and random orientations for the multiple presentations of the environment identifier; and
using one or more processors, combining the visual challenge and the contextual background into an image which is to be presented to the user in the specific environment, the contextual background associating the visual challenge with the specific environment.

* * * * *